US012354423B2

(12) United States Patent
Kuenzi et al.

(10) Patent No.: US 12,354,423 B2
(45) Date of Patent: Jul. 8, 2025

(54) AUTOMATIC ACCESS CONTROL BASED ON THIRD-PARTY DATABASE STATUS

(71) Applicant: Carrier Corporation, Palm Beach Gardens, FL (US)

(72) Inventors: Adam Kuenzi, Silverton, OR (US); Teri Briskey, Monmouth, OR (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 272 days.

(21) Appl. No.: 18/088,102

(22) Filed: Dec. 23, 2022

(65) Prior Publication Data

US 2023/0206707 A1 Jun. 29, 2023

Related U.S. Application Data

(60) Provisional application No. 63/293,382, filed on Dec. 23, 2021.

(51) Int. Cl.

*G07C 9/00* (2020.01)
*G07C 9/22* (2020.01)
*G07C 9/27* (2020.01)

(52) U.S. Cl.

CPC ........... *G07C 9/00571* (2013.01); *G07C 9/22* (2020.01); *G07C 9/27* (2020.01); *G07C 2209/08* (2013.01)

(58) Field of Classification Search

None

See application file for complete search history.

(56) References Cited

U.S. PATENT DOCUMENTS

| | | | | |
|---|---|---|---|---|
| 8,754,744 | B2 * | 6/2014 | Woodard | G06Q 10/00 340/5.3 |
| 9,194,157 | B2 * | 11/2015 | Bahar | G06Q 10/063 |
| 9,608,970 | B1 * | 3/2017 | Gehret | G07C 9/22 |
| 9,922,481 | B2 * | 3/2018 | Johnson | G07C 9/00 |
| 11,756,357 | B2 * | 9/2023 | Carter | B64U 50/39 348/155 |
| 2022/0172535 | A1 * | 6/2022 | Selstam | G07C 9/00571 |

* cited by examiner

*Primary Examiner* — K. Wong

(74) *Attorney, Agent, or Firm* — CANTOR COLBURN LLP

(57) ABSTRACT

A method of granting access to a visitor for a secured property including: receiving third-party opt-in information from a host via a first computer application accessed through a host computing device, the third-party opt-in information including an access grant authorizing a third-party service provider to grant access to an access control device that secures the secured property of the host; receiving a third-party service request from the host; assigning the third-party service request to the visitor; and granting the visitor an access to the access control device, wherein the visitor computing device is configured to transmit an access request to actuate the access control device and gain access to the secured property.

21 Claims, 3 Drawing Sheets

AUTOMATIC ACCESS CONTROL BASED ON THIRD-PARTY DATABASE STATUS

CROSS-REFERENCE TO RELATED APPLICATIONS

This application claims the benefit of U.S. provisional patent application No. 63/293,382, filed Dec. 23, 2021, the entire contents of which are incorporated herein by reference.

BACKGROUND

The embodiments herein generally relate to access control devices, and, more specifically, a method and apparatus to coordinate access to access control devices.

In order to access someone's secured property, physical keys, usernames, passcodes, and/or credentials, need to be manually transferred between the homeowner and the person desiring access to the secured property.

BRIEF DESCRIPTION

According to one embodiment, a method of granting access to a visitor for a secured property is provided. The method including: receiving third-party opt-in information from a host via a first computer application accessed through a host computing device, the third-party opt-in information including an access grant authorizing a third-party service provider to grant access to an access control device that secures the secured property of the host; receiving a third-party service request from the host; assigning the third-party service request to the visitor; and granting the visitor an access to the access control device, wherein the visitor computing device is configured to transmit an access request to actuate the access control device and gain access to the secured property.

In addition to one or more of the features described above, or as an alternative, further embodiments of may include that the visitor computing device is configured to transmit the access request directly to the access control device.

In addition to one or more of the features described above, or as an alternative, further embodiments of may include that the visitor computing device is configured to transmit the access request to a third-party service cloud database.

In addition to one or more of the features described above, or as an alternative, further embodiments of may include that the third-party service cloud database is configured to transmit the access request to an access control device server configured to communicates with the access control device using a proprietary communication protocol.

In addition to one or more of the features described above, or as an alternative, further embodiments of may include that the access request includes a credential to actuate the access control device.

In addition to one or more of the features described above, or as an alternative, further embodiments of may include: receiving the access request from the visitor computing device; and actuating the access control device in response to receiving the access request.

In addition to one or more of the features described above, or as an alternative, further embodiments of may include receiving a removal request from the host to no longer share the credential.

In addition to one or more of the features described above, or as an alternative, further embodiments of may include receiving a registration request from the visitor to gain access to the access control device.

In addition to one or more of the features described above, or as an alternative, further embodiments of may include that the visitor is a real-estate agent and the secured property is a real-estate property.

In addition to one or more of the features described above, or as an alternative, further embodiments of may include receiving a request from the real-estate agent to show the real-estate property.

In addition to one or more of the features described above, or as an alternative, further embodiments of may include receiving a designation from the host that the real-estate property is active, wherein the visitor is granted access to the access control device only when the real-estate property is active.

In addition to one or more of the features described above, or as an alternative, further embodiments of may include: receiving a designation from the host that the real-estate property is sold or pending; and revoking from the visitor the access to the access control device, wherein the visitor is granted access to the access control device only when the real-estate property is active.

In addition to one or more of the features described above, or as an alternative, further embodiments of may include that the visitor is granted access to the access control device for a selected period of time.

According to another embodiment, an access control system for granting access to a visitor of a secured property is provided. The access control system including: a processor; and a memory including computer-executable instructions that, when executed by the processor, cause the processor to perform operations, the operations including: receiving third-party opt-in information from a host via a first computer application accessed through a host computing device, the third-party opt-in information including an access grant authorizing a third-party service provider to grant access to an access control device that secures the secured property of the host; receiving a third-party service request from the host; assigning the third-party service request to the visitor; and granting the visitor an access to the access control device, wherein the visitor computing device is configured to transmit an access request to actuate the access control device and gain access to the secured property.

In addition to one or more of the features described above, or as an alternative, further embodiments of may include that the visitor computing device is configured to transmit the access request directly to the access control device.

In addition to one or more of the features described above, or as an alternative, further embodiments of may include that the visitor computing device is configured to transmit the access request to a third-party service cloud database.

In addition to one or more of the features described above, or as an alternative, further embodiments of may include that the access request includes a credential to actuate the access control device.

In addition to one or more of the features described above, or as an alternative, further embodiments of may include: receiving the access request from the visitor computing device; and actuating the access control device in response to receiving the access request.

In addition to one or more of the features described above, or as an alternative, further embodiments of may include that receiving a removal request from the host to no longer share the credential.

In addition to one or more of the features described above, or as an alternative, further embodiments of may include that receiving a registration request from the visitor to gain access to the access control device.

According to another embodiment, a computer program product tangibly embodied on a non-transitory computer readable medium is provided. The computer program product including instructions that, when executed by a processor, cause the processor to perform operations including: a processor; and a memory including computer-executable instructions that, when executed by the processor, cause the processor to perform operations, the operations including: receiving third-party opt-in information from a host via a first computer application accessed through a host computing device, the third-party opt-in information including an access grant authorizing a third-party service provider to grant access to an access control device that secures the secured property of the host; receiving a third-party service request from the host; assigning the third-party service request to a visitor; and granting the visitor an access to the access control device, wherein the visitor computing device is configured to transmit an access request to actuate the access control device and gain access to the secured property.

Technical effects of embodiments of the present disclosure include a third-party database that facilitates granting of access to an access control device of a secured property without the need of the host of the secured property to transfer credentials of the access control device directly to visitors to the secured property.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As aforementioned, in order to access someone's secured property, physical keys, usernames, passcodes, and/or credentials, need to be manually transferred between the homeowner and the person desiring access to the secured property. The embodiments disclosed herein seek to provide a streamlined method for authorized and approved users to gain access to someone's secured property.

Figure 1:
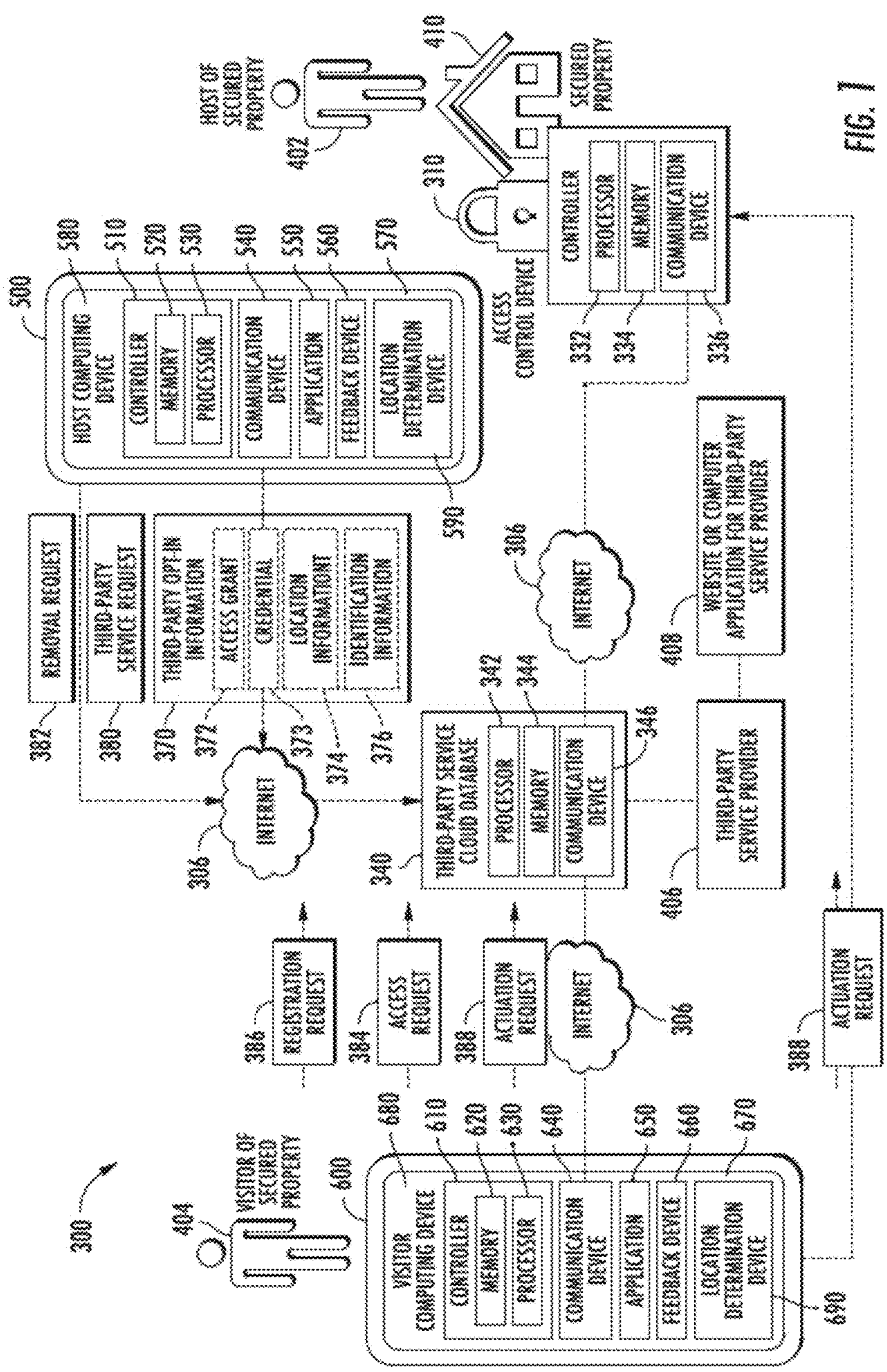
FIG. 1 is a schematic diagram of an exemplary access control system, according to an embodiment of the present disclosure.

Referring now to FIG. 1, a schematic diagram of an exemplary access control system 300 is illustrated, according to an embodiment of the present disclosure. It should be appreciated that, although particular systems are separately defined in the schematic block diagrams, each or any of the systems may be otherwise combined or separated via hardware and/or software.

The access control system 300, as illustrated, includes the third-party service cloud database 340, an access control device 310, a first computer application 550 installed or accessible on a host computing device 500, and a second computer application 650 installed or accessible on a visitor computing device 600. It is understood that the first computer application 550 and the second computer application 650 may be the same mobile application but just installed on two different devices 500, 600 and/or accessible from the two different devices 500, 600. The first computer application 550 and the second computer application 650 may be accessible from two different devices 500, 600, such as, for example, a software-as-a service or a website. The first computer application 550 and the second computer application 650 may be in communication with the cloud database via the internet 306.

The access control device 310 may be a smart lock system that controls access to a secured property 410. The access control device 310 may be an internet of things (IoT) connected device. The access control device 310 may be a smart lock, a smart door lock, a smart lock on a security deposit box, a car door lock, a vehicle door lock, a garage door control system, storage unit smart lock, a smart lock for a locker, a smart lock on a post office Box, a smart lock on a drop box, and any other similar access control device 310 that may secure access to a secured property 410. The secured property 410 may be a home, an apartment, a garage, a room, a shed, a storage unit, a security deposit box, a locker, a post office box, a drop box, a car, a vehicle, or any other secured area known to one of skill in the art. The secured property 410 may be owned by a host 402, rented by a host 402, in possession of a host 402, in control by the host 402, leased by the host 402, or mortgaged by the host 402. The host 402 may be a person, an organization, a group, a partnership, a company, or a corporation.

The access control device 310 includes a controller 330 that is configured to communicate with the first computer application 550, the second computer application 650, and the third-party service cloud database 340. The controller 330 may be an electronic controller including a processor 332 and an associated memory 334 comprising computer-executable instructions (i.e., computer program product) that, when executed by the processor 332, cause the processor 332 to perform various operations. The processor 332 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 334 may be but is not limited to a random access memory (RAM), read only memory (ROM), or other electronic, optical, magnetic or any other computer readable medium.

The controller 330 also includes a communication device 336. The communication device 336 may be capable of wireless communication including but not limited to Wi-Fi, Bluetooth, Zigbee, Sub-GHz RF Channel, cellular, satellite, or any other wireless signal known to one of skill in the art. The communication device 336 may be configured to communicate with the third-party service cloud database 340 through the internet 306 using the communication device 336. The communication device 336 may be connected to the internet 306 through a Wi-Fi router or home automation system (not shown). Alternatively, or additionally, the communication device 336 may be configured to communicate directly with the third-party service cloud database 340.

The third-party service cloud database 340 may belong to and/or be managed by a third-party service provider 406, such as, for example a real-estate multiple listing service (MLS) provider, a delivery service, a repair person service, a painter service, a dog sitter service, a cleaning service, an inspector service, an appraiser service, a dog grooming service, a dog walking service, a babysitting service, a massaging service, a hair styling service, a makeup service, a laundry service, or any service provider that may operate a business where said service provider needs access to a secured property 410 that is secured by an access control device 310.

If the third-party service provider 406 is an MLS provider, the secured property 410 may be a listed home that is listed in the third-party service cloud database 340 (e.g., MLS database) with a status, such as, for example, "active", "pending" or "sold". The host 402 of the secured property 410 may opt-in for the secured property 410 to be listed in the third-party service cloud database 340. When the hosts 402 designates the secured property 410 (e.g., listed property) as active then a visitor 404 (e.g., real-estate agent or potential buyer) may be allowed to schedule showings of the secured property 410 and have access to the access control device 310 at their showing time.

When the hosts 402 designates the secured property 410 (e.g., listed property) as sold or pending then a visitor 404 (e.g., real-estate agent or potential buyer) will no longer be allowed to schedule showings of the secured property 410 and will not have access to the access control device 310. Advantageously, this allows for automatic granting and revoking of access based on the status of the secured property 410 (e.g., listed property) in the third-party service cloud database 340 (e.g., MLS database). Otherwise, someone would have to manually grant/revoke access to all visitors (e.g., real estate agents), which is an arduous task.

The third-party service cloud database 340 may be a database to control and coordinate the service provided by the third-party service provider 406. The third-party service provider 406 may broker service arrangements between the host 402 and the visitor 404 regarding the secured property 410 are an item, object, person, or animal at the secured property 410. The third-party service provider 406 may be a person, an organization, a group, a partnership, a company, or a corporation.

The host computing device 500 may belong to or be in possession of a host 402 of the secured property 410. The visitor computing device 600 may belong to or be in possession of a visitor 404 to the secured property 410. The relationship between the host 402 and the visitor 404 may be established via the third-party service provider 406. The visitor 404 may be coming to the secured property 410 to perform a service and will need access to the secure property 410 in order to perform that service, thus the visitor 404 will need to actuate the access control device 310 in order to gain access to the secured property 410 to perform the service. The visitor 404 may be a real-estate agent showing the secured property 410 to a potential buyer, a potential buyer of the secured property 410, a delivery person delivering something to the secured property 410, a repair person service repairing something at the secured property 410, a painter painting something at the secured property 410, a dog sitter taking care of a dog at the secured property 410, a cleaning service cleaning the secured property 410, an inspector inspecting something at the secured property 410 or the secured property itself, an appraiser service appraising something at the secured property 410 or the secured property itself, a dog groomer grooming a dog at the secured property 410, a dog walker walking a dog at the secured property 410, a baby sitter babysitting a child at the secured property 410, a masseuse massaging someone at the secured property 410, a hair styling service styling hair at the secured property 410, a makeup artist doing makeup at the secured property 410, a laundry service picking up laundry at the secured property 410, an employee of the third-party service provider 406, a contractor of the third-party service provided 406, or any service provider that may require access to the secured property to perform their service.

The third-party service cloud database 340 may be a remote computer server that includes a processor 342 and an associated memory 344 comprising computer-executable instructions (i.e., computer program product) that, when executed by the processor 342, cause the processor 342 to perform various operations. The processor 342 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 344 may be but is not limited to a random access memory (RAM), read only memory (ROM), or other electronic, optical, magnetic or any other computer readable medium.

The third-party service cloud database 340 also includes a communication device 346. The communication device 346 may be capable of communication with the internet. The communication device 346 may be configured to communicate with the host computing device 500 and the visitor computing device 600 through the internet 306. The communication device 346 may be a software module that handles communications to and from the computer applications 550, 650.

The host computing device 500 may be a desktop computer, a laptop computer, or a mobile computing device that is typically carried by a person, such as, for example a phone, a smart phone, a PDA, a smart watch, a tablet, a laptop, or any other mobile computing device known to one of skill in the art.

The host computing device 500 includes a controller 510 configured to control operations of the host computing device 500. The controller 510 may be an electronic controller including a processor 530 and an associated memory 520 comprising computer-executable instructions (i.e., computer program product) that, when executed by the processor 530, cause the processor 530 to perform various operations. The processor 530 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 520 may be but is not limited to a random access memory (RAM), read only memory (ROM), or other electronic, optical, magnetic or any other computer readable medium.

The host computing device 500 includes a communication device 540 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the host computing device 500 may be connected to the internet 306 through a hardwired connection. The host computing device 500 is configured to communicate with the third-party service cloud database 340 through the internet 306.

The host computing device 500 may include a display device 580, such as for example a computer display, an LCD display, an LED display, an OLED display, a touchscreen of a smart phone, tablet, or any other similar display device known to one of the skill in the art. A user operating the host computing device 500 is able to view the first computer application 550 through the display device 580.

The host computing device 500 includes an input device 570 configured to receive a manual input from a user (e.g., human being) of computing device 500. The input device 570 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the host computing device 500, or any similar input device known to one of skill in the art. The user operating the host computing device 500 is able to enter data into the first computer application 550 through the input device 570. The input device 570 allows the user operating the host computing device 500 to data into the first computer application 550 via a manual input to input device 570. For example, the user may respond to a prompt on the display device 580 by entering a manual input via the input device 570. In one example, the manual input may be a touch on the touchscreen. In an embodiment, the display device 580 and the input device 570 may be combined into a single device, such as, for example, a touchscreen.

The host computing device 500 device may also include a feedback device 560. The feedback device 560 may activate in response to a manual input via the input device 570. The feedback device 560 may be a haptic feedback vibration device and/or a speaker emitting a sound. The feedback device 560 may activate to confirm that the manual input entered via the input device 570 was received via the first computer application 550. For example, the feedback device 560 may activate by emitting an audible sound or vibrate the host computing device 500 to confirm that the manual input entered via the input device 570 was received via the first computer application 550.

The host computing device 500 may also include a location determination device 590 that may be configured to determine a location of the host computing device 500 using cellular signal triangulation, a global position satellite (GPS), or any location termination method known to one of skill in the art.

The visitor computing device 600 may be a desktop computer, a laptop computer, or a mobile computing device that is typically carried by a person, such as, for example a phone, a smart phone, a PDA, a smart watch, a tablet, a laptop, or any other mobile computing device known to one of skill in the art.

The visitor computing device 600 includes a controller 610 configured to control operations of the visitor computing device 600. The controller 610 may be an electronic controller including a processor 630 and an associated memory 620 comprising computer-executable instructions (i.e., computer program product) that, when executed by the processor 630, cause the processor 630 to perform various operations. The processor 630 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 620 may be but is not limited to a random access memory (RAM), read only memory (ROM), or other electronic, optical, magnetic or any other computer readable medium.

The visitor computing device 600 includes a communication device 640 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the visitor computing device 600 may be connected to the internet 306 through a hardwired connection. The visitor computing device 600 is configured to communicate with the third-party service cloud database 340 through the internet 306.

The visitor computing device 600 may include a display device 680, such as for example a computer display, an LCD display, an LED display, an OLED display, a touchscreen of a smart phone, tablet, or any other similar display device known to one of the skill in the art. A user operating the visitor computing device 600 is able to view the second computer application 650 through the display device 680.

The visitor computing device 600 includes an input device 670 configured to receive a manual input from a user (e.g., human being) of computing device 600. The input device 670 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the visitor computing device 600, or any similar input device known to one of skill in the art. The user operating the visitor computing device 600 is able to enter data into the second computer application 650 through the input device 670. The input device 670 allows the user operating the visitor computing device 600 to data into the second computer application 650 via a manual input to input device 670. For example, the user may respond to a prompt on the display device 680 by entering a manual input via the input device 670. In one example, the manual input may be a touch on the touchscreen. In an embodiment, the display device 680 and the input device 670 may be combined into a single device, such as, for example, a touchscreen.

The visitor computing device 600 device may also include a feedback device 660. The feedback device 660 may activate in response to a manual input via the input device 670. The feedback device 660 may be a haptic feedback vibration device and/or a speaker emitting a sound. The feedback device 660 may activate to confirm that the manual input entered via the input device 670 was received via the second computer application 650. For example, the feedback device 660 may activate by emitting an audible sound or vibrate the visitor computing device 600 to confirm that the manual input entered via the input device 670 was received via the second computer application 650.

The visitor computing device 600 may also include a location determination device 690 that may be configured to determine a location of the visitor computing device 600 using cellular signal triangulation, a global position satellite (GPS), or any location termination method known to one of skill in the art.

A third-party service request 380 may be scheduled or requested using the first application 550 and/or the second application 650, then stored in the third-party service cloud database 340. Alternatively, the showings may be scheduled using a different website and/or application and may be accessible by the third-party service cloud database 340. The third-party service provider 406 may have their own website or computer application 408 to schedule their third-party service and that may be connected or in communication with the third-party service cloud database 340 The third-party service request 380 may include what service is requested, a price, service details, and/or when the service is to be scheduled.

The third-party service provider 406 may have the service scheduled in through their own website or computer application 408, which then calls the application programming interface (API) for the third-party service cloud database 340 to indicate the scheduled service. The third-party service cloud database 340 then sends a signal to unlock the access control device 310 at the scheduled time, or when the visitor 404 is at the secured property 410.

In another embodiment, a visitor 404 may be scheduled through an API to the third-party service cloud database 340, which then sends a credential to the visitor computing device 600 that can use the credential to send it to the access control device 310 to open.

In order for the service to be performed, the host 402 must first opt-in to granting third-party service providers 406 and visitors 404 access to the access control device 310 of the secured property 410. In order to opt-in, the host 402 may transmit third-party opt-in information 370 to the third-party service cloud database 340. The host 402 may transmit the third-party opt-in information 370 to the third-party service cloud database 340 via the first computer application 550 using the host computing device 500.

The host 402 may transmit the third-party opt-in information 370 prior to any third-party service request 380 and the third-party opt-in information 370 may be stored in the third-party service cloud database 340 in the event a third-party service request 380 is later submitted. The host 402 may transmit the third-party opt-in information 370 when, shortly after, or after the access control device 310 is installed on the secured property 410 or the secured property 410 changes hosts 402. When ownership of the access control device 310 changes hands from an old host 402 to a new host 402, the third-party opt-in information may no longer be valid and may have to be renewed by the new host 402.

The third-party opt-in information 370 may include an access grant 372 by the host 402 to the access control device 310, location information 374 of the access control device 310 and/or the secured property 410, and identification information 376 of the access control device 310. The access grant 372 is authorization from the host 402 for the third-party service provider 406 to grant a visitor 404 access to control the access control device 310 of the secured property 410 when the visitor 404 is fulfilling the third-party service request 380. The access grant 372 may include time restrictions on when the credential 373 may be used and for how long.

The visitor 404 may be assigned by the third-party service provider 406 or selected by the host 402 through a website or computer application 408 of the third-party service provider 406 or the second computer application 650. The host 402 may also select a specific visitor 404 through the first computer application 550. The access grant 372 may include the credential 373 for the access control device 310 that will allow a visitor 404 to actuate the access control device 310 to access the secured property 410. The third-party service 340 may authorize the visitor 404 to utilize the credential 373 via the second computer application 650 to actuate the access control device 310 to perform the service at the secured property 410. The visitor 404 may only have access to utilization of the credential for a limited period of time as designated by the third-party service request 380.

The visitor 404 may have to register with the third-party service cloud database 340 in order to be assigned third-party service requests 380 by submitting a registration request 386. The registration request 386 may include any details on the background of the visitor 404 including, accreditations, background checks, licenses, certifications, degrees, experience, or any other similar information. The visitor 404 may have to submit an access request 384 to access specific secured properties 410 or be assigned specific third-party service requests 380. For example, a real-estate agent that desires to show a secured property 410 (e.g., a real-estate listing) to a potential buyer may have to submit an access request 384 to secure a date and time for the real-estate showing and receive the credential 373. The real-estate agent may only receive this information if they have submitted their registration request 386 showing that they are authorized to show real-estate properties (e.g., licensed by the state) and the real-estate property is for sale. A real-estate property (e.g., secured property) may be listed for sale by a host 402 submitting a third-party service request 380 indicating their real-estate property is for sale and they would like realtors to show the real-estate property.

The visitor 404 may obtain the credential to actuate the access control device 310 in a variety of different ways. The access control device 310 is programmed with an encryption key and a unique identifier (i.e., a serial number). The access control device 310 is associated with the secured property 410 in the database 340. When the access request 384 is made to grant the third party service provider 406 access to the property 380 and the visitor 404 is selected to provide the service, then the third-party service cloud database 340 determines which access control device 310 is on the secured property 410 and uses its knowledge of the encryption key from the third-party service cloud database 340 to generate a credential (e.g., a set of data that encodes their access rights and is encrypted/signed cryptographically with the encryption key). The credential 373 is sent to the visitor computing device 600, which can then connect to the access control device 310 over the wireless communication from the communication device 640 of the visitor computing device 600 to the communication device 336 of the access control device 310 and transfer the credential 373 with an actuation request 388. The access control device 310 validates the credential and if the credential is valid, the access control device 310 actuates (e.g., unlocks or opens).

In an alternate embodiment, the credential 373 from the visitor computing device 600 may be used to authenticate the visitor 404 as being an authorized person. The validation of the credential 373 (i.e., login/password) can be done by the third-party service cloud database 340 with prior knowledge of their 'account' information. Then, the computer application 650 can download all of the access control devices 310 and secured properties 410 that the visitor 404 is allowed to access. When the visitor computing device 600 is in proximity, the visitor 404 can select an option to 'open' the access control device 310 (e.g., lock) through the computer application 650 to transmit an actuation request 388 to the database 340, which then verifies their credential (i.e., they are authentic). Then, if their access rights in the database and everything is good, a message is sent over the internet 306 to the access control device 310 and the access control device 310 (e.g., lock) is actuated or opened.

In an alternate embodiment, the host computing device 500 could have a credential 373 for the access control device 310 that is sent to the third party service cloud database 340 and then is shared with the visitor 404 via the computer application 650 of the visitor computing device 600 so that the visitor 404 can actuate the access control device 310.

The location information 374 may be any location information used to find the secured property 410 and access control device 310, such as, for example, a street address, a location address, an apartment number, a storage unit number, a lock box number, a post office box number, a parking space, a GPS location, a parking garage name/floor, or any other location information known to one of skill in the art.

The identification information 376 may include information about the access control device 310, including, but not limited to, a model number, and a serial number.

The third-party service request 380 may grant access to visitors 404 for a limited period of time or an opened ended period of time. For example, the limited period of time may be a specific time of day when a person may be cleaning a home. In another example, an opened ended period of time may be for a period when a house is listed for sale, showing real-estate agents may register with the third-party service provider 406 and schedule showings of the secured property 410 as long as the house is listed for sale. A first third-party service request 380 may establish that the secured property 410 is listed for sale and then a removal request 382 may establish that the secured property 410 is no longer listed for sale, so that visitors 404 may no longer access the property.

Figure 2:
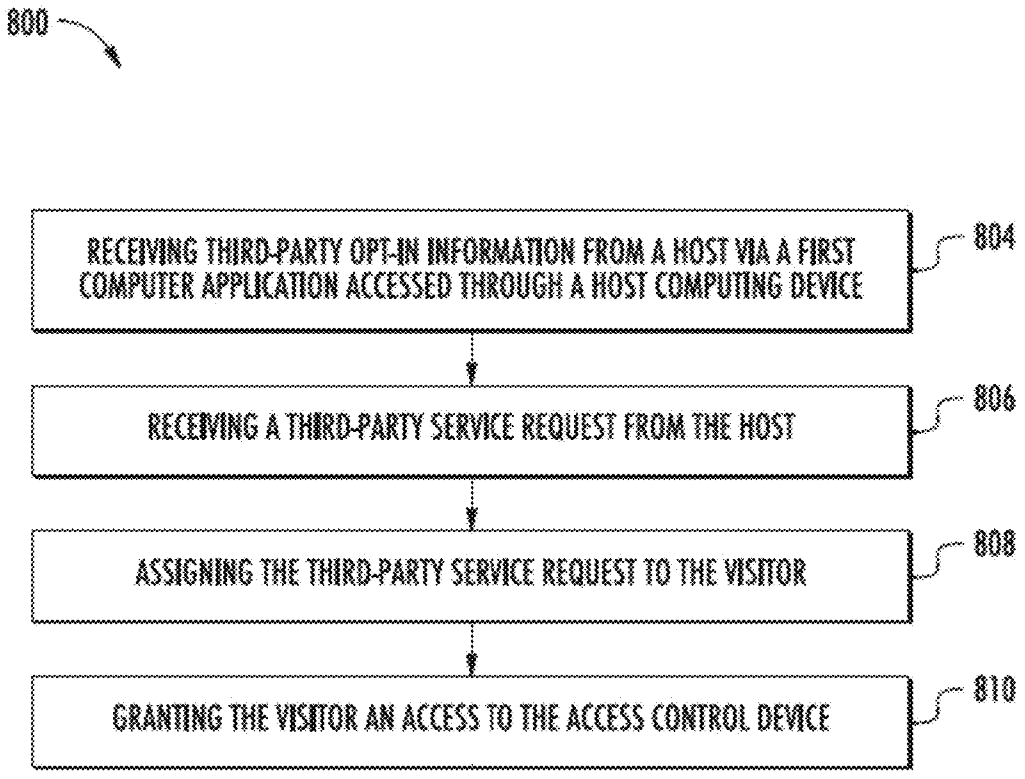
FIG. 2 is a flow process illustrating an exemplary method of granting access to a visitor for a secured property is illustrated, according to an embodiment of the present disclosure.

Referring to FIG. 2, within continued references to FIGS. 1-2, a flow diagram illustrating a method 800 of granting access to a visitor 404 for a secured property 410 is illustrated, in accordance with an embodiment of the present disclosure.

At block 804, third-party opt-in information 370 from a host 402 is received via a first computer application 550 accessed through a host computing device 500. The third-party opt-in information 370 including an access grant 372 authorizing a third-party service provider 406 to grant access to an access control device 310 that secures a secured property 410 of the host 402 by sharing a credential 373 for the access control device 310.

At block 806, a third-party service request 380 is received from the host 402.

At block 808, the third-party service request 380 is assigned to a visitor 404. The third-party service request 380 may be assigned to the visitor 404 via a second computer application 650 accessible by the visitor 404 through a visitor computing device 600 or by the third-party service provider 406, which results in a push notification to the visitor computing device 600 that indicates they now have access (and when) to the access control device 310.

At block 810, the visitor 404 is granted an access to the access control device 310. The visitor 404 may be granted the access to the access control device 310 for a selected period of time. The access is authorization for the visitor to actuate the access control device 310.

The visitor 404 may be granted the access to the access control device 310 by transferring of a credential 373, as aforementioned. In one example, the credential 373 may transmitted to the visitor computing device 600 via the second computer application 650. The visitor computing device 600 may be configured to transmit the credential 373 to the access control device 310 to actuate the access control device 310 and gain access to the secured property 410. The method 800 may further include that the credential 373 is transmitted from the visitor computing device 600 to the access control device 310 and the access control device 310 is actuated in response to receiving the credential 373. The transmission of the credential 373 may only be required if the access control device 310 is not connected to the internet.

Whereas, if the access control device 310 is connected to the internet 306 then the credential 373 may not be necessary and the access control device 310 may verify with the third-party service cloud database 340 that visitor computing device 600 of the visitor 404 is authorized to actuate the access control device 310 during the selected period of time.

The method 800 may also include that a removal request 382 is received from the host 402 to no longer share the credential 373.

The method 800 may yet also include receiving a registration request 386 from the visitor 404 to gain access to the credential 373.

In an embodiment, the visitor 404 is a real-estate agent and the secured property 410 is a real-estate property. The method 800 may include receiving a request (e.g., access request 384) from the real-estate agent to show the real-estate property. The real-estate agent may be required to send the request as an access request 384 in order to request a time to show the secured property 410 and the credential 373 for the secured property 410.

In an embodiment, the credential 373 may include a time restriction, that allows the visitor computing device 600 to utilize the credential 373 only for a selected period of time. The time restriction may require the visitor 404 to use the credential 373 up until a certain day or time. The time restriction may require the visitor 404 to use the credential 373 during a certain day and a time.

While the above description has described the flow process of FIG. 2 in a particular order, it should be appreciated that unless otherwise specifically required in the attached claims that the ordering of the steps may be varied.

Figure 3:
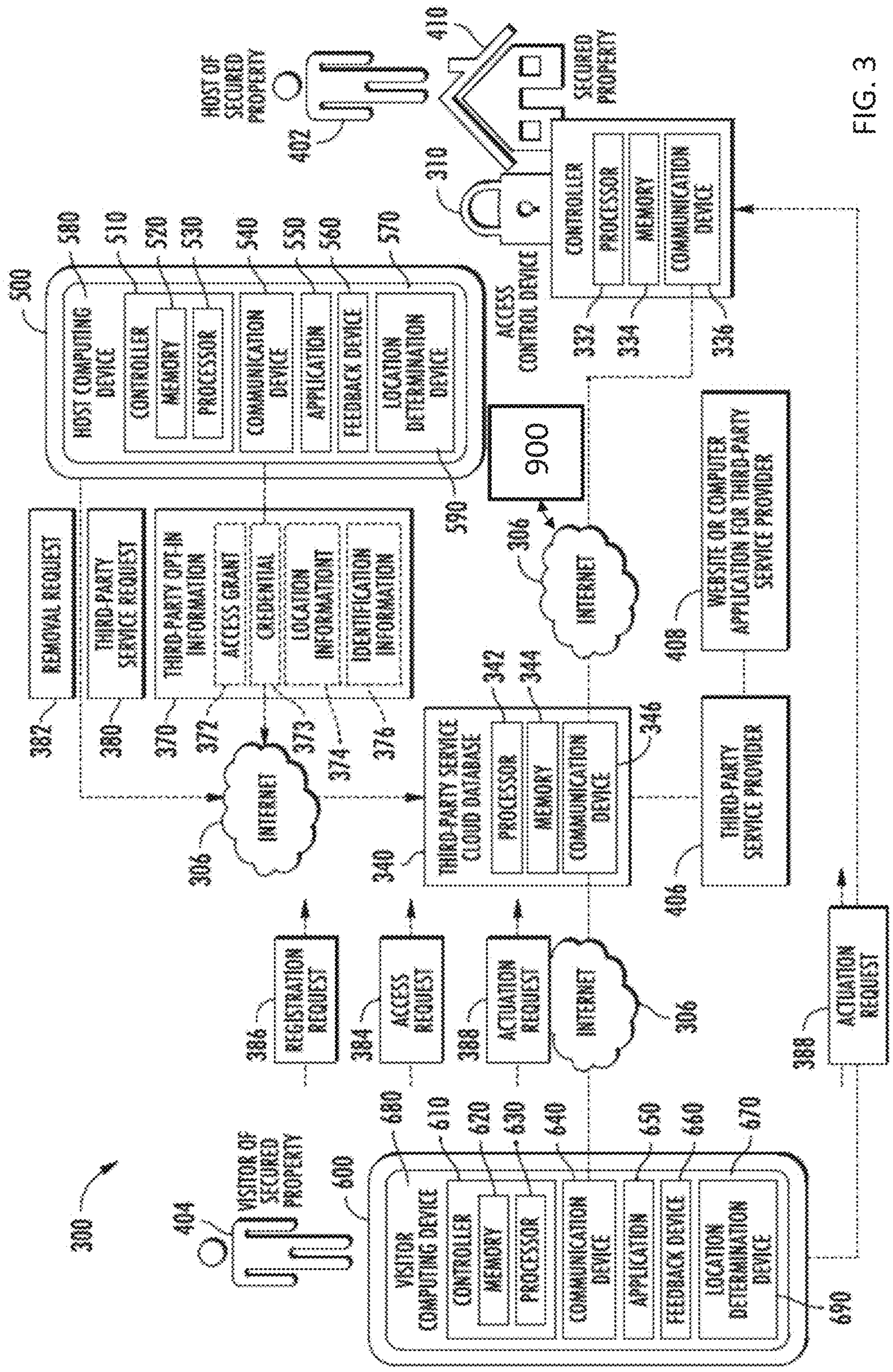
FIG. 3 is a schematic diagram of an exemplary access control system, according to another embodiment of the present disclosure.

FIG. 3 is a schematic diagram of an exemplary access control system, according to another embodiment of the present disclosure. In some embodiments, the third-party service cloud database 340 of the third-party service provide 406 cannot directly communicate with the access control device 310. The access control device 310 (e.g., a lock) may use a proprietary communication protocol supported by the manufacturer of the access control device 310. For such situations, the system includes an access control device server 900, as shown in FIG. 3. The access control device server 900 may include a processor, associated memory and communication device, of the type described herein. The access control device server 900 may communicate with the third-party service cloud database 340 over the internet 306. The access control device server 900 may communicate with the access control device 310 over the internet 306.

In operation, the host 402 may register the access control device 310 with the access control device server 900 (e.g., provide serial number of access control device 310, model, etc.). When the actuation request 388 is received from the visitor computing device 600 at the third-party service cloud database 340, the third-party service cloud database 340 still verifies the credential 373 included with the actuation request 388. When the actuation request 388 is verified by the third-party service cloud database 340, the credential 373 is sent from the third-party service cloud database 340 to the access control device server 900 to grant access to the access control device 310. The access control device server 900 the communicates with the access control device 310, using the proprietary communication protocol, to allow the visitor 404 access the access control device 310.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of granting access to a visitor for a secured property, the method comprising:

receiving third-party opt-in information from a host via a first computer application accessed through a host computing device, the third-party opt-in information including an access grant authorizing a third-party service provider to grant access to an access control device that secures the secured property of the host;

receiving a third-party service request from the host;

assigning the third-party service request to the visitor; and granting the visitor an access to the access control device, wherein the visitor computing device is configured to transmit an access request to actuate the access control device and gain access to the secured property;

wherein the visitor is a real-estate agent and the secured property is a real-estate property;

wherein the visitor access to the access control device is granted only for a scheduled showing time stored on a third-party service cloud database.

2. The method of claim 1, wherein the visitor computing device is configured to transmit the access request directly to the access control device.

3. The method of claim 1, wherein the visitor computing device is configured to transmit the access request to the third-party service cloud database.

4. The method of claim 3, wherein the third-party service cloud database is configured to transmit the access request to an access control device server configured to communicates with the access control device using a proprietary communication protocol.

5. The method of claim 1, wherein the access request includes a credential to actuate the access control device.

6. The method of claim 1, further comprising:

receiving the access request from the visitor computing device; and actuating the access control device in response to receiving the access request.

7. The method of claim 1, further comprising:

receiving a removal request from the host to no longer share the credential.

8. The method of claim 1, further comprising:

receiving a registration request from the visitor to gain access to the access control device.

9. The method of claim 1, further comprising:

receiving a request from the real-estate agent to show the real-estate property;

receiving a designation from the host that the real-estate property is active, wherein the visitor is granted access to the access control device only when the real-estate property is active;

receiving a designation from the host that the real-estate property is sold or pending; and revoking from the visitor the access to the access control device when the showing time is completed;

wherein the visitor is granted access to the access control device only when the real-estate property is active.

10. The method of claim 1, further comprising:

receiving a request from the real-estate agent to show the real-estate property.

11. The method of claim 1, further comprising:

receiving a designation from the host that the real-estate property is active, wherein the visitor is granted access to the access control device only when the real-estate property is active.

12. The method of claim 1, further comprising:

receiving a designation from the host that the real-estate property is sold or pending; and revoking from the visitor the access to the access control device, wherein the visitor is granted access to the access control device only when the real-estate property is active.

13. An access control system for granting access to a visitor of a secured property, the access control system comprising:

a processor; and a memory comprising computer-executable instructions that, when executed by the processor, cause the processor to perform operations, the operations comprising:

receiving third-party opt-in information from a host via a first computer application accessed through a host computing device, the third-party opt-in information including an access grant authorizing a third-party service provider to grant access to an access control device that secures the secured property of the host;

receiving a third-party service request from the host;

assigning the third-party service request to the visitor; and granting the visitor an access to the access control device, wherein the visitor computing device is configured to transmit an access request to actuate the access control device and gain access to the secured property;

wherein the visitor is a real-estate agent and the secured property is a real-estate property;

wherein the visitor access to the access control device is granted only for a scheduled showing time stored on a third-party service cloud database.

14. The access control system of claim 13, wherein the visitor computing device is configured to transmit the access request directly to the access control device.

15. The access control system of claim 13, wherein the visitor computing device is configured to transmit the access request to the third-party service cloud database.

16. The access control system of claim 15, wherein the third-party service cloud database is configured to transmit the access request to an access control device server configured to communicate with the access control device using a proprietary communication protocol.

17. The access control system of claim 15, wherein the access request includes a credential to actuate the access control device.

18. The access control system of claim 15, further comprising:

receiving the access request from the visitor computing device; and actuating the access control device in response to receiving the access request.

19. The access control system of claim 15, further comprising:

receiving a removal request from the host to no longer share the credential.

20. The access control system of claim 15, further comprising:

receiving a registration request from the visitor to gain access to the access control device.

21. A computer program product tangibly embodied on a non-transitory computer readable medium, the computer program product including instructions that, when executed by a processor, cause the processor to perform operations comprising:

a processor; and a memory comprising computer-executable instructions that, when executed by the processor, cause the processor to perform operations, the operations comprising:

receiving third-party opt-in information from a host via a first computer application accessed through a host computing device, the third-party opt-in information including an access grant authorizing a third-party service provider to grant access to an access control device that secures the secured property of the host;

receiving a third-party service request from the host;

assigning the third-party service request to a visitor; and granting the visitor an access to the access control device, wherein the visitor computing device is configured to transmit an access request to actuate the access control device and gain access to the secured property;

wherein the visitor is a real-estate agent and the secured property is a real-estate property;

wherein the visitor access to the access control device is granted only for a scheduled showing time stored on a third-party service cloud database.

* * * * *